United States Patent
Opalinski et al.

(10) Patent No.: US 9,582,588 B2
(45) Date of Patent: Feb. 28, 2017

(54) METHODS AND SYSTEMS FOR PROVIDING CUSTOM CRAWL-TIME METADATA

(71) Applicant: Google Inc., Mountain View, CA (US)

(72) Inventors: Pawel Opalinski, Mountain View, CA (US); Eric Jon Anderson, Sunnyvale, CA (US); John Felton, Pleasanton, CA (US); Brandon Player Iles, Mountain View, CA (US)

(73) Assignee: Google Inc., Mountain View, CA (US)

( * ) Notice: Subject to any disclaimer, the term of this patent is extended or adjusted under 35 U.S.C. 154(b) by 839 days.

(21) Appl. No.: 13/721,857

(22) Filed: Dec. 20, 2012

(65) Prior Publication Data

US 2013/0332445 A1    Dec. 12, 2013

Related U.S. Application Data

(60) Provisional application No. 61/656,830, filed on Jun. 7, 2012.

(51) Int. Cl.
*G06F 17/30*       (2006.01)

(52) U.S. Cl.
CPC .... *G06F 17/3087* (2013.01); *G06F 17/30011* (2013.01); *G06F 17/30864* (2013.01); *G06F 17/30896* (2013.01)

(58) Field of Classification Search
None
See application file for complete search history.

(56) References Cited

U.S. PATENT DOCUMENTS

| | | | | |
|---|---|---|---|---|
| 5,123,104 A * | 6/1992 | Levine | ............. | G06F 17/30348 |
| 6,493,731 B1 * | 12/2002 | Jones et al. | ............ | G06Q 10/10 |
| | | | | 715/234 |
| 6,493,762 B1 * | 12/2002 | Chen | ...................... | H04H 60/06 |
| | | | | 455/3.01 |
| 6,513,028 B1 * | 1/2003 | Lee | ................... | G06F 17/30327 |
| 6,519,604 B1 * | 2/2003 | Acharya | .......... | G06F 17/30536 |
| | | | | 707/738 |
| 6,549,952 B1 * | 4/2003 | Ault et al. | ............. | H04L 67/02 |
| | | | | 719/311 |

(Continued)

OTHER PUBLICATIONS

Network Working Group, Uniform Resouce Identifier (URI): Generic Syntax, Jan. 2005, retrieved on Nov. 11, 2015, retrieved from the Internet <URL: https://tools.ietf.org/html/rfc3986#section-2.1>.*

(Continued)

*Primary Examiner* — Tyler Torgrimson
(74) *Attorney, Agent, or Firm* — Brake Hughes Bellermann LLP

(57) ABSTRACT

A method for providing metadata to a search engine for a document that is not in a mark-up language includes sending a request for data about the document and receiving a response to the request that has a Hyper-Text Transfer Protocol (HTTP or HTTPS) header that includes metadata associated with the document in a name-value pair and the document's content. The method also includes extracting the name-value pair from the HTTP-header and creating a mark-up language tag for the name-value pair and providing the make-up language tag and the contents of the document in a mark-up language format to a search index creation component.

16 Claims, 4 Drawing Sheets

(56) References Cited

U.S. PATENT DOCUMENTS

| | | | | |
|---|---|---|---|---|
| 6,925,595 | B1* | 8/2005 | Whitledge | G06F 17/30905 707/999.004 |
| 7,372,976 | B2* | 5/2008 | Rhoads et al. | G06F 17/30026 382/100 |
| 7,567,949 | B2* | 7/2009 | Chaudhuri | G06F 17/30536 |
| 7,644,069 | B2* | 1/2010 | Chen | G06F 17/30106 707/723 |
| 7,676,553 | B1* | 3/2010 | Laucius | G06F 17/30864 709/219 |
| 7,814,204 | B1* | 10/2010 | Wang et al. | H04L 12/00 707/781 |
| 7,895,189 | B2* | 2/2011 | Balmin | G06F 17/30929 707/715 |
| 8,024,411 | B2* | 9/2011 | Pulfer | G06Q 10/107 707/769 |
| RE42,892 | E* | 11/2011 | Montulli | G06F 17/30899 709/203 |
| 8,069,162 | B1* | 11/2011 | Emigh | G06F 17/30707 707/706 |
| 8,352,483 | B1* | 1/2013 | Ramesh | G06F 17/3002 707/758 |
| 8,843,815 | B2* | 9/2014 | Yang | G06F 17/30722 715/200 |
| 8,972,375 | B2 | 3/2015 | Opalinski et al. | |
| 2002/0065955 | A1* | 5/2002 | Gvily | G06F 17/22 719/330 |
| 2003/0018668 | A1* | 1/2003 | Britton | G06F 17/241 715/230 |
| 2004/0225639 | A1* | 11/2004 | Jakobsson | G06F 17/30463 |
| 2005/0060168 | A1 | 3/2005 | Murashige et al. | |
| 2005/0182938 | A1* | 8/2005 | Seshadri | G06Q 10/107 713/176 |
| 2006/0036564 | A1* | 2/2006 | Yan | G06Q 30/0201 |
| 2006/0155685 | A1* | 7/2006 | Grim, III | G06F 17/30864 |
| 2007/0050338 | A1* | 3/2007 | Strohm et al. | G06F 17/30864 |
| 2007/0083483 | A1* | 4/2007 | Lawande | G06F 17/30501 |
| 2007/0136263 | A1* | 6/2007 | Williams | G06F 17/30648 |
| 2008/0027971 | A1* | 1/2008 | Statchuk | G06F 17/30864 |
| 2008/0052269 | A1* | 2/2008 | Abdo | G06F 17/30536 |
| 2008/0133454 | A1* | 6/2008 | Markl | G06F 17/30457 |
| 2008/0140626 | A1* | 6/2008 | Wilson | G06F 17/30864 |
| 2008/0313247 | A1 | 12/2008 | Galvin | |
| 2009/0006474 | A1* | 1/2009 | Richardson | G06F 17/3028 |
| 2009/0094382 | A1* | 4/2009 | Tsimelzon et al. | G06F 9/44 709/246 |
| 2009/0271421 | A1* | 10/2009 | Gemulla | G06F 17/30306 |
| 2010/0306273 | A1* | 12/2010 | Branigan | G06F 17/30911 707/802 |
| 2012/0078874 | A1* | 3/2012 | Gonzalez et al. | G06F 17/30864 707/709 |
| 2012/0166478 | A1* | 6/2012 | Das | G06F 17/30442 707/769 |
| 2012/0310941 | A1* | 12/2012 | Macdonald et al. | G06F 17/3089 707/740 |
| 2013/0332443 | A1 | 12/2013 | Opalinski et al. | |
| 2014/0136510 | A1* | 5/2014 | Parkkinen | G06F 17/30336 707/711 |
| 2014/0207754 | A1* | 7/2014 | Lashley | G06F 17/30442 707/715 |

OTHER PUBLICATIONS

W3Schools, The <meta> tag, Jan. 5, 2005 retrieved on Nov. 12, 2015, retrieved from the Internet <URL: https://web.archive.org/web/20050105044954/http://www.w3schools.com/tags/tag_meta.asp>.*

Non-Final Office Action received for U.S. Appl. No. 13/721,863, mailed on May 7, 2014, 22 pages.

Blachman et al., "How Google Works—Google Guide", Feb. 2, 2007, 5 pages.

Google, "DBConnectorConfigurationDetails- Google-Enterprise-Connector-Database", Jul. 7, 2010, 3 pages.

Google, "Configuring File System Connector", Apr. 29, 2011, 2 pages.

Google, "Administering Crawl: Introduction", Google Search Appliance software version 6. 14, Nov. 2011, 15 pages.

Notice of Allowance for U.S. Appl. No. 13/721,863, mailed on Nov. 6, 2014, 8 pages.

"Connector Developer's Guide: About This Guide", Google Search Appliance Software Version 6.2, Connector Manager Version 2.4.0, retrieved from 'google-enterprise-connector-manager.googlecode.com/svn/docs/devguide/2.4.0/cdg_about.html,' Dec. 2009, 3 pages.

"Connector Developer's Guide: Introduction", Google Search Appliance Software Version 6.2, Connector Manager Version 2.4.0, retrieved from 'google-enterprise-connector-manager.googlecode.com/svn/docs/devguide/2.4.0/cdg_intro.html,' Dec. 2009, 14 pages.

* cited by examiner

US 9,582,588 B2

METHODS AND SYSTEMS FOR PROVIDING CUSTOM CRAWL-TIME METADATA

RELATED APPLICATIONS

This application claims priority under 35 U.S.C. §119 to Provisional Patent Application Ser. No. 61/656,830, entitled "Methods and Systems for Providing Custom Crawl-Time Metadata" and filed on Jun. 7, 2012. The subject matter of this earlier filed application is hereby incorporated by reference.

TECHNICAL FIELD

This disclosure generally relates to searching document repositories and, more particularly, to providing metadata to a search engine for documents that are not in a mark-up language format.

BACKGROUND

With the advent of the Internet, search engines were created to assist users in locating information from among the millions of documents, mostly web pages, created and available through the use of the Internet. Similar search engines have also been created to search document repositories available internally to an organization. But unlike most documents available over the Internet, many of these internal organization's documents are not in a mark-up language format, such as HTML, XHTML, YAML, CFML, XML, etc.

Search engines generally use metadata, or data about the document, to improve the search results of a particular query. Metadata can be supplied by the author of the document or by a software program that creates the document. Mark-up languages provide an author of a document a simple way to supply metadata to a search engine, usually in the form of a META tag in the primary content of the document. Because the vast majority of the documents available over the Internet are written in a mark-up language format, search engines have been developed to identify and use the information contained in a META tag in creating search indexes and responding to queries.

But the META tag is not available for documents that do not use a markup language, such as HTML. Thus, the META tag is not available for many of the documents created and stored internally by organizations. While the contents of these documents may be available to a search engine, metadata about these documents is not generally available, resulting in poorer quality search results.

SUMMARY

According to one general aspect, a computer-implemented method for providing metadata to a search engine for a document that is not in a mark-up language includes receiving, from a search engine server, a request for contents of the document, the document having a format distinct from a mark-up language format. The method further includes locating metadata associated with the document, creating name-value pairs for the metadata, and providing a response to the server, the response comprising the name-value pair in an HTTP (or HTTPS) header and the contents of the document. In some implementations, the method includes deriving the located metadata using information from the contents of the document. In further implementations, the metadata is retrieved from a document repository or document management system storing the document. A predetermined header name may identify the name-value pair in the HTTP header. In some implementations the method may also include retrieving the located metadata from a user interface that receives the metadata from a user.

These and other aspects can include one or more of the following features. For example, the name-value pair may be percent-encoded and the document management system may not be visible to the search engine.

In another general aspect, a computer-implemented method for providing metadata to a search engine for a document that is not in a mark-up language includes sending a request for contents of the document and receiving a response to the request, the response comprising an HTTP header with metadata about the document in a name-value pair and the content associated with the document. The method further includes extracting the name-value pair from the HTTP header, creating a mark-up language tag for the name-value pair, and providing the make-up language tag and the contents of the document in a mark-up language format to a search index creation component. In further implementations, the mark-up language is XML and the tag is an XML meta element. In some implementations, the name-value pair is percent encoded. In some implementations the metadata provided in the mark-up language tag replaces prior metadata indexed by the search index creation component.

According to yet another general aspect, a tangible computer-readable storage medium having recorded and embodied thereon instructions that, when executed by a processor of a computer system, cause the computer system to receive, from a search engine server, a request for contents of the document, the document having a format distinct from a mark-up language format. The instructions further cause the computer system to locate metadata associated with the document, create name-value pairs for the metadata, and prove a response to the server, the response comprising the name-value pair in an HTTP header and the contents of the document.

According to yet another general aspect, a system may include a memory configured to store executable code, and a processor coupled to the memory, the processor configured to execute the code to send a request for contents of the document and receive a response to the request, the response comprising an HTTP header with metadata about the document in a name-value pair and the content associated with the document. The processor may further execute the code to extract the name-value pair from the HTTP header, create a mark-up language tag for the name-value pair, and provide the make-up language tag and the contents of the document in a mark-up language format to a search index creation component.

The system may include one or more of the following features. For example, processor may be further configured to execute the code to percent-encode the name-value pair and to use a pre-determined header name to identify the name-value pair in the HTTP header. As another example, the metadata provided in the mark-up language tag may replace prior metadata indexed by the search index creation component. In some implementations the mark-up language is XML and the tag is an XML meta element. In some implementations the content is primary content and the metadata is distinct from the primary content.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
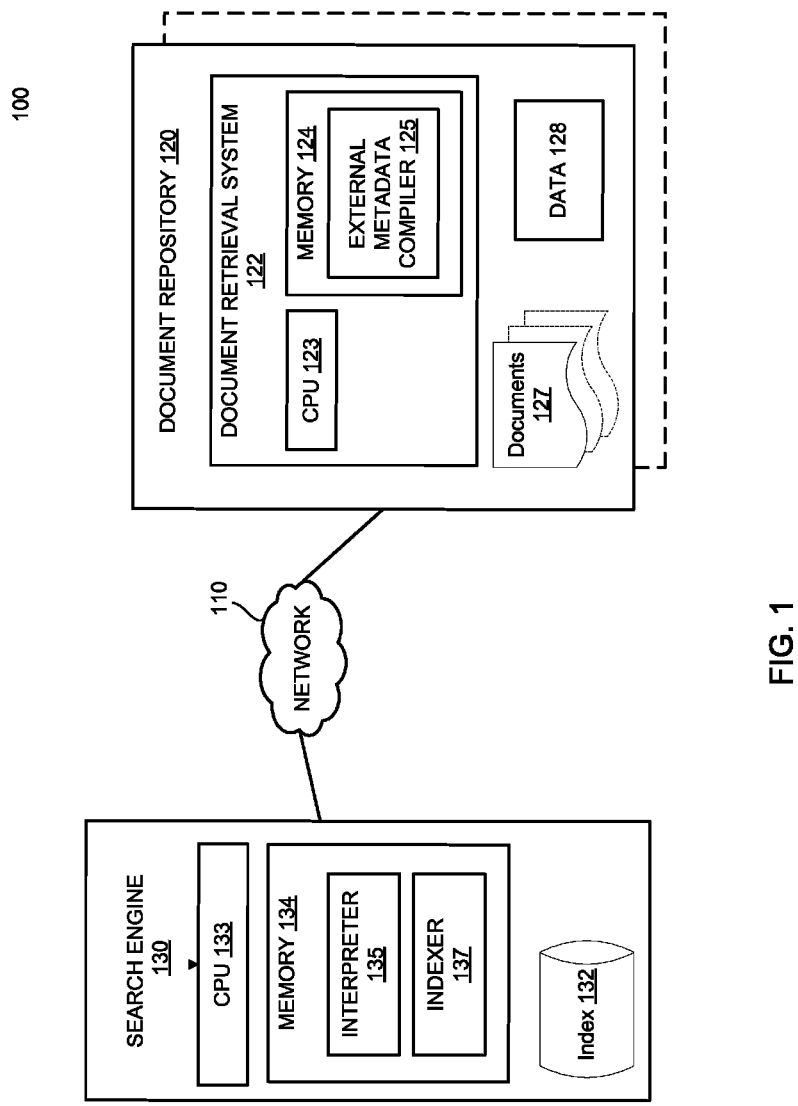
FIG. 1 illustrates an exemplary system in accordance with the disclosed subject matter.

A system and method is disclosed for providing metadata about documents that are not in a mark-up language format to a search engine. The system and method provide the metadata in a format already familiar to the engine so that no change is needed to index and use the metadata. Furthermore, some implementations provide the metadata automatically at the time the search engine requests the documents, for example at the time the documents are crawled, ensuring that updates to the metadata are automatically found. Some implementations include two components, an external metadata compiler and an interpreter. The external metadata compiler may gather the metadata about a document that is not in a mark-up language format and create a special HTTP header for the document. The external metadata compiler may put the metadata into name-value pairs in a percent-encoded format, enabling the data to be passed to the interpreter in an HTTP response. The interpreter component may read the HTTP header created by the external metadata compiler and create a mark-up language fragment for the document. The HTML fragment may be read and interpreted by an index creation program for a search engine in the same manner as other mark-up language documents.

In various implementations, the search engine may be an Internet-based search engine, or the search engine may be an enterprise or organization-based search engine. In an enterprise implementation, the search engine may search document repositories available internally to the organization, such as network directories or document version-control libraries, in addition to servers visible to the public. Such internal document repositories are not usually accessible to Internet search engines but may be available to organization-based search engines.

The activity of a search engine looking for documents to index and catalog is often referred to as "crawling." In Internet-based crawls, the search engine may send a request to a website for the contents of a webpage hosted by the website. The website responds to the request with the contents of the website, which may include META tags. The response is often in the format of an HTTP (Hyper Text Transfer Protocol) response. HTTP is a request-response protocol developed for communicating over networks, such as the Internet. The protocol involves standards that ensure that the diverse computers communicating over the network use the same request-response format, and is the basis for communication using the World Wide Web. Because of this, most search engines send requests and receive responses using the HTTP protocols.

An HTTPS request/response is a secure, for example encrypted, version of an HTTP request/response. Implementations work with HTTPS responses as well as HTTP responses. Therefore, for the purposes of this document, reference to an HTTP protocol, request, response, or header also refers and applies to an HTTPS protocol, request, response, or header.

One HTTP protocol is generally referred to as percent encoding. Percent encoding designates certain characters as reserved and others as unreserved. Reserved characters have a specified meaning within the protocol and cannot be used without percent encoding. Unreserved characters do not need to be encoded. For example, the percent sign ("%") is a reserved character. It is used to mark the beginning of an encoded character. For this reason, if an actual percent sign is to be communicated, it must be encoded. Encoding generally takes the form of %<hexvalue> where <hexvalue> is the hexadecimal ASCII equivalent of the character being encoded. For example, the percent sign has a hexadecimal value of 25 and would be percent-encoded as "% 25". Percent encoding is described in RFC3986, available at ietf.org.

FIG. 1 is a block diagram of a search network 100 in accordance with an example implementation. The network 100 may be used to implement an Internet-based search system or an organization-specific search system using the techniques described herein. The depiction of network 100 in FIG. 1 is shown by way of example. It will be appreciated that other network configurations may be used for implementing such techniques.

Figure 4:
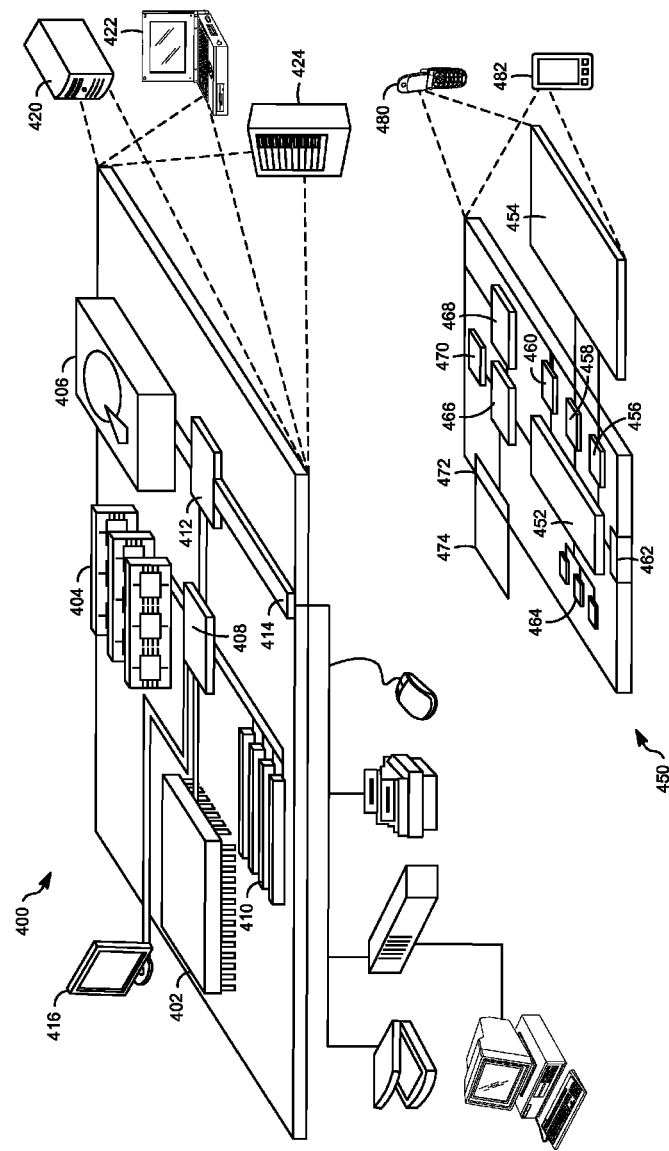
FIG. 4 shows an example of a computer device and a mobile computer device that can be used to implement the techniques described here.

The network 100 includes computing devices 122 and 130. The computing devices 122 and 130 may take the form of a number of different devices, such as a personal computer, laptop computer, tablet computer, netbook computer, or a web-enabled phone, as examples. The devices 122 and 130 may be examples of computer device 400 or mobile computer device 450, as depicted in FIG. 4.

As shown in FIG. 1, computing device 122 may be a document retrieval system that is part of a document repository system 120. In some implementations document repository system 120 is a webserver that houses one or more websites. Each website may include one or more web pages, with each web page constituting a document 127 in the document repository 120. In other implementations, document repository 120 may include a document management system that controls access to documents, performs version control, and captures metadata about the documents it manages, or it may include a network file system. In such implementations, document repository 120 may not be visible to search engines, unlike websites. Instead, search engines may only have access to the documents associated with document repository 120 through document retrieval system 122. In one such example, the search engine may be provided with a URL, or other location identifier, for a document management system. The provided URL contains an instance of the external metadata compiler 125 that accesses the documents stored by the document management system. The URL (or other location identifier) may be provided to the search engine, giving the search engine an indication that documents are available at that location. In such an implementation, the external metadata compiler 125 provides a bridge between the search engine and the document management system because the document management system is not visible to, for example cannot be directly accessed or searched by, the search engine. Such an implementation may also be used to search network directory locations and other document repositories that are not visible to the search engine.

Document retrieval system 122 may include a CPU 123 and memory 124. Memory 124 may include any type of storage device that stores information in a format that can be read and/or executed by CPU 123. In some implementations memory 124 may include one or more software applications, such as external metadata compiler 125. In other implementations, external metadata compiler 125 may be stored in an external storage device (not shown) and loaded into memory 124.

External data compiler 125 may contain instructions that cause CPU 123 to perform certain operations, including locating a requested document, identifying metadata associated with the requested document, converting the metadata into name-value pairs and creating a specialized HTTP header for the name-value pairs. In some implementations the external data compiler 125 may be included in an adaptor, such as the adaptor described in U.S. Provisional Application No. 61/656,755, filed Jun. 7, 2012, entitled "ADAPTING CONTENT REPOSITORIES FOR CRAWLING AND SERVING," the disclosure of which is incorporated herein by reference in its entirety.

Document repository system 120 may also include one or more documents 127. Documents 127 are documents created in a format that is not a mark-up language format. For example, documents 127 may be word processing documents, PDF documents, spreadsheets, Power Point documents, etc. Metadata may be stored in documents 127 in the form of data collected and maintained by the applications that created the document. Such metadata may be part content of the document but not the primary content. Primary content of a document may be the portion of the document normally visible to a user, e.g. the portion of the document that the user directly creates, edits, and/or views. Metadata about the documents 127 may also be stored, for example, in data repository 128. The data in repository 128 may be collected and maintained by document repository 120 as part of a document management system, or it may be collected from the author of the document using a user-interface. In some implementations, the user interface is created specifically for collecting user-defined metadata about a specific document 127.

In the example of FIG. 1, computing device 130 may be a search engine and may include CPU 133 and memory 134. Like memory 124, memory 134 may include any type of storage device that stores information in a format that can be read and/or executed by CPU 133. In some implementations memory 134 may include one or more software applications, such as interpreter 135 and indexer 137. In other implementations, software applications, such as interpreter 135 and indexer 137 may be stored in an external storage device (not shown) and loaded into memory 134.

Interpreter 135 may contain instructions that cause CPU 133 to perform certain operations, including making a request of document retrieval system 122 to crawl for one or more documents, receiving a response to the request, and translating any metadata name-value pairs in a special HTTP header to a mark-up language format. Indexer 137 may contain instructions that cause CPU 133 to perform certain operations, including receiving metadata and document primary content, parsing the contents and storing information about the primary contents and the metadata in a format that can be used to respond to search queries. Indexer 137 may also create a search index 132 for the search engine 130. The search index 132 may be used to respond to search queries.

In the network 100, the document repository 120 and search engine 130 are coupled with a network 110. The network 110 may include a data access network that provides access to the Internet and/or the World Wide Web. Via the network 110, the document repository 120 and search engine 130 may communicate with each other using, for example, HTTP protocols.

While search network 100 illustrates only a single document repository 120, and search engine 130, it will be appreciated that additional document repositories and search engines may be included in network 100.

Figure 2:
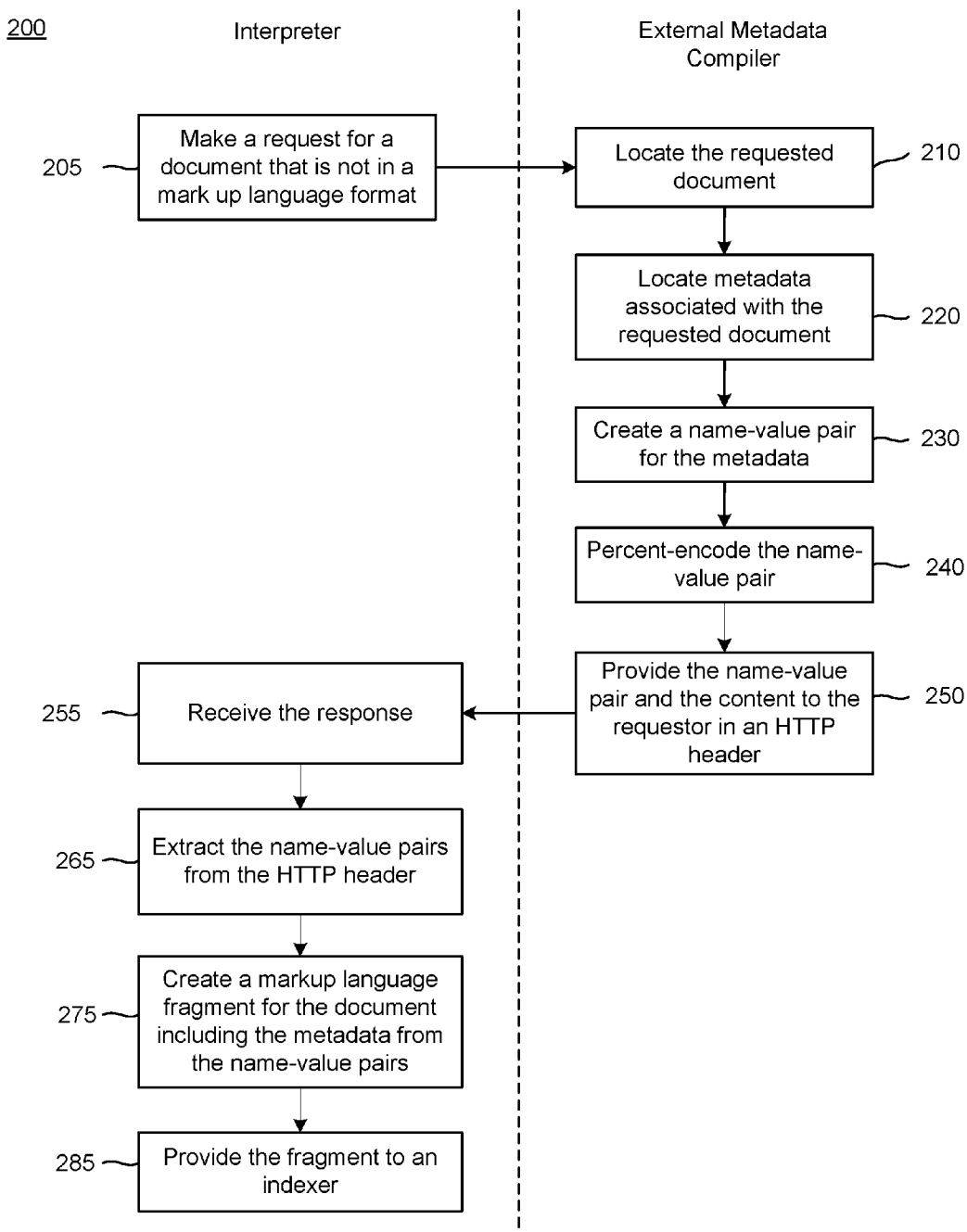
FIG. 2 is illustrates a flow diagram of an exemplary process for creating custom metadata for non-markup language documents and providing the metadata to a search engine, consistent with example implementations.

FIG. 2 is a flow diagram of an exemplary process for creating custom metadata for non-markup language documents and providing the metadata to a search engine. The flowchart shown in FIG. 2 may be performed at least in part by a search engine (e.g., search engine 130 shown in FIG. 1) and a computing device associated with a document repository (e.g., document retrieval system 122 shown in FIG. 1). As shown in FIG. 2, the interpreter component of a search engine may make a request for a document that is not in a mark-up language format (step 205). Such a request may be made as part of a request to crawl all or part of a document repository or as a request for a specific document. Documents that are not in a mark-up language format include PDF documents, word processing documents, spreadsheets, slide show presentations, CAD documents, etc. In some implementations, the request is made using the HTTP protocol.

A document retrieval system 122 may receive the request, which may be handled by an external metadata compiler component. The external metadata compiler may locate the document requested (step 210) and identify metadata associated with the requested document (step 220). For example, the external metadata compiler may look for metadata produced by a software program that created the document as part of the document contents. While this metadata may be part of the document contents, the metadata may not be included in the primary content, which is content generally editable and/or viewable by a user. Such metadata may include the author, the date and time created, the date and time updated, the author of the updates, the subject, etc. In other implementations the metadata may have been produced by a document management system, and may include an organizational department associated with the document, a project or client number associated with the document, a category for the document, etc. In further implementations, the metadata may be provided by an author of the document through, for example a user interface. The user interface may be part of document retrieval system 122, an interface provided as part of the software that created the document, an interface provided with a document management system, etc.

The metadata provided by a user may be stored in a database and may have no pre-defined constraints, just as metadata provided in a META tag has no constraints. A user may provide a name and a value for the metadata without having to adhere to predefined formats. For example, a user may provide topics, keywords, titles, etc. for a document through a user interface that collects the type of metadata, such as the name, a value for the metadata, and information identifying the document. In yet other implementations metadata may be derived from the directory location where the document is stored on a network.

Figure 3:
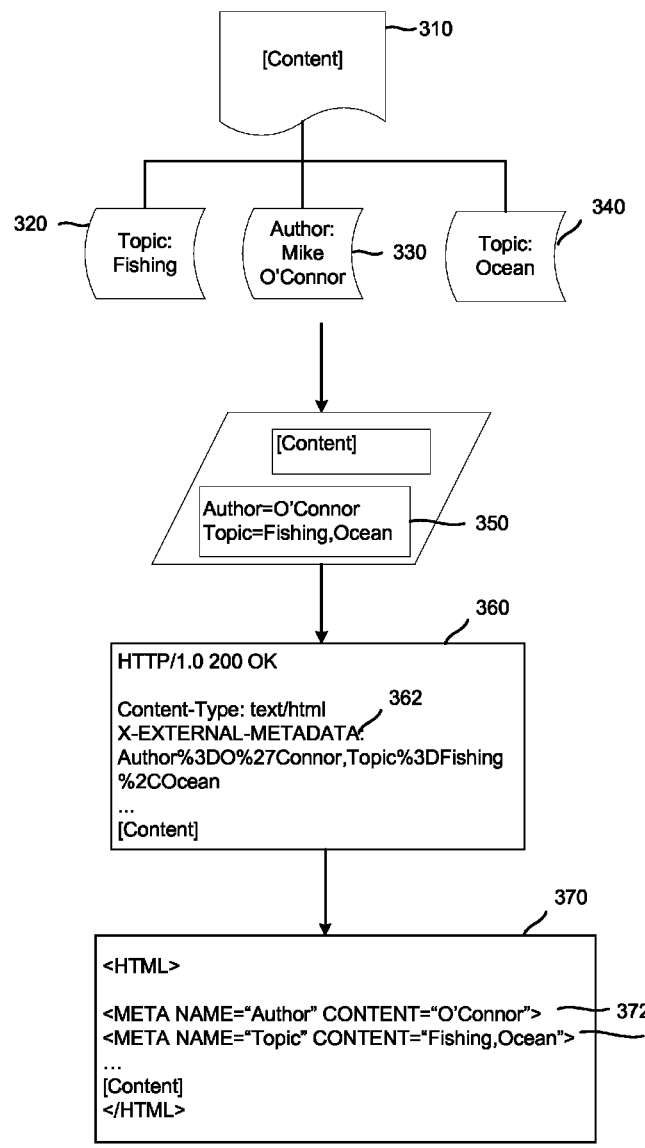
FIG. 3 illustrates exemplary data elements created and used in the process of FIG. 2.

The external metadata compiler may then create a name-value pair for the located metadata (step 230). FIG. 3 illustrates exemplary name-value pairs created and percent encoded by the external metadata compiler. In FIG. 3 the external metadata compiler receives a request for a document 310 and locates the document 310. As previously discussed, document 310 may reside on a webserver, on a network drive, or in a document management system. Document 310 includes content and is associated with three metadata items; topic 320, author 330, and topic 340. Once the external metadata compiler locates document 310 and its associated metadata, the external metadata compiler may create name-value pairs 350 for the metadata. In the example of FIG. 3, the name-value pairs have a format of "name=value,value" although implementations are not limited to this format. Thus, in this example, metadata 330 becomes "Author=O'Connor" and Metadata 320 and 340 are combined to form "Topic=Fishing,Ocean" because both have the same metadata name.

Returning to FIG. 2, the external metadata compiler may percent-encode the name-value pair (step 240) and provide the name-value pair and the content of the document in an HTTP header (step 250). FIG. 3 shows the name-value pair 350 as part of HTTP header 360. As illustrated in FIG. 3, the equal sign (=), the apostrophe ('), and the comma (,) have been percent encoded as "% 3D", "% 27", and "% 2C" respectively. The name-value pairs, after percent-encoding, are included in HTTP header 360 with a pre-determined header name 362. The pre-determined header name 362 may enable the requesting search engine to identify the external metadata compiled by the external metadata compiler and format the metadata so that it can be identified by the indexer of the search engine. As discussed above, the external metadata compiler may provide an HTTP response with HTTP header 360 to the requestor of the document.

With regard to FIG. 2, the interpreter may receive the HTTP response from the external metadata compiler (step 255) and extract the name-value pairs from the header of the response (step 265). In some implementations, the interpreter may locate the name-value pairs using a pre-determined header name, such as header name 362 in FIG. 3. After having extracted the name-value pairs, the interpreter may create a mark-up language fragment for the document (step 275) that includes the data from the name-value pairs and the content of the document. In the example of FIG. 3, the interpreter may receive HTTP header 360 and identify the metadata by header name 362. The interpreter may then create HTML fragment 370, which includes three META tags. In the example shown in FIG. 3, META tag 372 corresponds with metadata 330, META tag 374 corresponds with metadata 320 and metadata 340.

The interpreter may provide the fragment to an indexer of the search engine (step 285). An indexer of a search engine creates the search index for the search engine by parsing the metadata and content of a mark-up language document, such as an HTML document, and cataloging the words, main ideas, and metadata contained in the document. The indexer then uses this information to create an index that is used to respond to search queries. In some implementations, the indexer replaces any metadata that may have been indexed earlier for the same document. Thus, the use of process 200 enables the search engine to provide metadata that is external to a document, in other words is not stored directly in the primary document content, to the indexer in a format that the indexer already recognizes. The external metadata thus becomes searchable in the same way that other metadata, for example metadata provided from mark-up language documents, is searchable.

In one implementation, process 200 may be implemented on an enterprise-level using an enterprise search engine. An enterprise search engine may provide a 'universal search for business', in that most of an organization's content, such as Intranets, Web servers, corporate portals, file shares, databases, document management systems, line-of-business applications, Enterprise Applications, and Business Intelligence (BI) systems, can be searched via a single search engine. Metadata about the various documents stored in the organization's content may be provided using a process similar to process 200. The indexer of the enterprise search engine may then index the metadata and the primary content of the documents, providing additional avenues to locate the documents. For example, a user may search for documents authored by a particular person, even if the document is a spreadsheet. The metadata provided through, for example, process 200 may enable the enterprise search engine to locate such documents even if the documents do not store metadata as part of the primary content because, for example, the documents are not in a mark-up language format.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for providing metadata for a document that is not in a mark-up language format to a search index, the method comprising:

sending, from a search engine, a request for data about the document;

receiving, by the search engine, a response to the request comprising a Hyper Text Transfer Protocol (HTTP) header that includes metadata about the document in a name-value pair and content associated with the document;

extracting the name-value pair from the HTTP header;

creating, at the search engine, a mark-up language tag for the name-value pair; and providing the mark-up language tag and contents of the document in a mark-up language format to a search index creation component of the search engine.

2. The method of claim 1, wherein the name-value pair is percent-encoded.

3. The method of claim 1, further comprising performing the extracting, creating, and providing in response to identifying a pre-determined header name, wherein the name-value pair follow the pre-determined header name in the HTTP header.

4. The method of claim 1, wherein the metadata provided in the mark-up language tag replaces prior metadata indexed by the search index creation component.

5. The method of claim 1, wherein the mark-up language is Extensible Markup Language (XML) and the tag is an XML meta element.

6. A tangible computer-readable storage medium having recorded and embodied thereon instructions that, when executed by the one or more processors, cause a computer system to perform the method of claim 1.

7. The method of claim 1, wherein the data is from a document management system storing the document.

8. A search engine comprising:

a memory configured to store executable code; and a processor operably coupled to the memory, the processor configured to execute the code to:

send a request for data about a document as part of a crawling operation;

receive a response to the request comprising a Hyper Text Transfer Protocol (HTTP header that includes metadata about the document in a name-value pair and content associated with the document;

extract the name-value pair from the HTTP header;

create a mark-up language tag for the name-value pair; and provide the mark-up language tag and contents of the document in a mark-up language format to a search index creation component of the search engine.

9. The search engine of claim 8, wherein the name-value pair is percent-encoded.

10. The search engine of claim 8, the processor further configured to execute the code to perform the extracting, creating, and providing in response to identifying a pre-determined header name, wherein the name-value pair follow the pre-determined header name in the HTTP header.

11. The search engine of claim 8, wherein the metadata provided in the mark-up language tag replaces prior metadata indexed by the search index creation component.

12. The search engine of claim 8, wherein the mark-up language is Extensible Markup Language (XML) and the tag is an XML meta element.

13. The search engine of claim 8, wherein the content is primary content and the metadata is distinct from the primary content.

14. The search engine of claim 8, wherein the data is from a document management system storing the document.

15. The search engine of claim 14, wherein the document management system is not directly accessible by the search index creation component.

16. The method of claim 7, wherein the document management system is not directly accessible by the search index creation component.

* * * * *

UNITED STATES PATENT AND TRADEMARK OFFICE
CERTIFICATE OF CORRECTION

PATENT NO. : 9,582,588 B2  Page 1 of 1
APPLICATION NO. : 13/721857
DATED : February 28, 2017
INVENTOR(S) : Opalinski et al.

It is certified that error appears in the above-identified patent and that said Letters Patent is hereby corrected as shown below:

In the Claims

In Column 12, Line 41, Claim 8, delete "(HTTP" and insert --(HTTP)--, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*